US007389471B2

(12) United States Patent
Croney et al.

(10) Patent No.: US 7,389,471 B2
(45) Date of Patent: Jun. 17, 2008

(54) UTILIZING COMMON LAYOUT AND FUNCTIONALITY OF MULTIPLE WEB PAGES

(75) Inventors: Joseph K. Croney, Kirkland, WA (US); David Serge Ebbo, Redmond, WA (US); Dmitry Robsman, Bellevue, WA (US); Mark T. Anders, Kirkland, WA (US); Scott David Guthrie, Bellevue, WA (US); Ting-Hao Yang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 10/459,852

(22) Filed: Jun. 11, 2003

(65) Prior Publication Data

US 2004/0255233 A1 Dec. 16, 2004

(51) Int. Cl.
*G06F 7/32* (2006.01)
(52) U.S. Cl. .................. 715/209; 715/234; 715/243; 715/246; 715/249; 715/251; 709/225
(58) Field of Classification Search ............... 715/513, 715/501.1, 530, 234, 243, 246, 249, 251; 707/517; 709/205, 225
See application file for complete search history.

(56) References Cited

U.S. PATENT DOCUMENTS 6,112,242 A * 8/2000 Jois et al. .................. 709/225
6,605,120 B1 * 8/2003 Fields et al. ............... 715/513
6,754,885 B1 * 6/2004 Dardinski et al. .......... 717/113
6,928,610 B2 * 8/2005 Brintzenhofe et al. ...... 715/517
6,968,331 B2 * 11/2005 Bar-Yossef et al. ............ 707/2
2002/0138516 A1 * 9/2002 Igra .......................... 707/513
2003/0004993 A1 * 1/2003 Templeton et al. ......... 707/513
2003/0014442 A1 * 1/2003 Shiigi et al. ................ 707/513

OTHER PUBLICATIONS

David McFarland, Dreamweaver MX—The Missing Manual, Nov. 1, 2002, O'Reilly, Chapter 18.*
Freeway 3.0, Feb. 12, 2001, SoftPress, http://web.archive.org/web/20010212133504/www.softpress.com/freeway/freeway3.0feature.html.*

* cited by examiner

*Primary Examiner*—Stephen Hong
*Assistant Examiner*—Wilson Tsui
(74) *Attorney, Agent, or Firm*—Workman Nydegger

(57) ABSTRACT

Web pages that share a common layout and/or functionality are associated with at least one master page and at least one endpoint page. Each master page specifies a common layout and/or functionality that are intended to be shared between the web pages. The master pages also include content place holders that identify content segments that are intended to be replaced by content that is obtained from the at least one endpoint page. When a client system requests one of the web pages, the server system merges the appropriate master page and endpoint page into a resulting page that can be rendered as the requested web page by the client system. This enables web pages sharing common features to be created automatically, in real-time, and transparently to the client system, and without having to redundantly store duplicative content for each of the web pages at the server system.

23 Claims, 4 Drawing Sheets

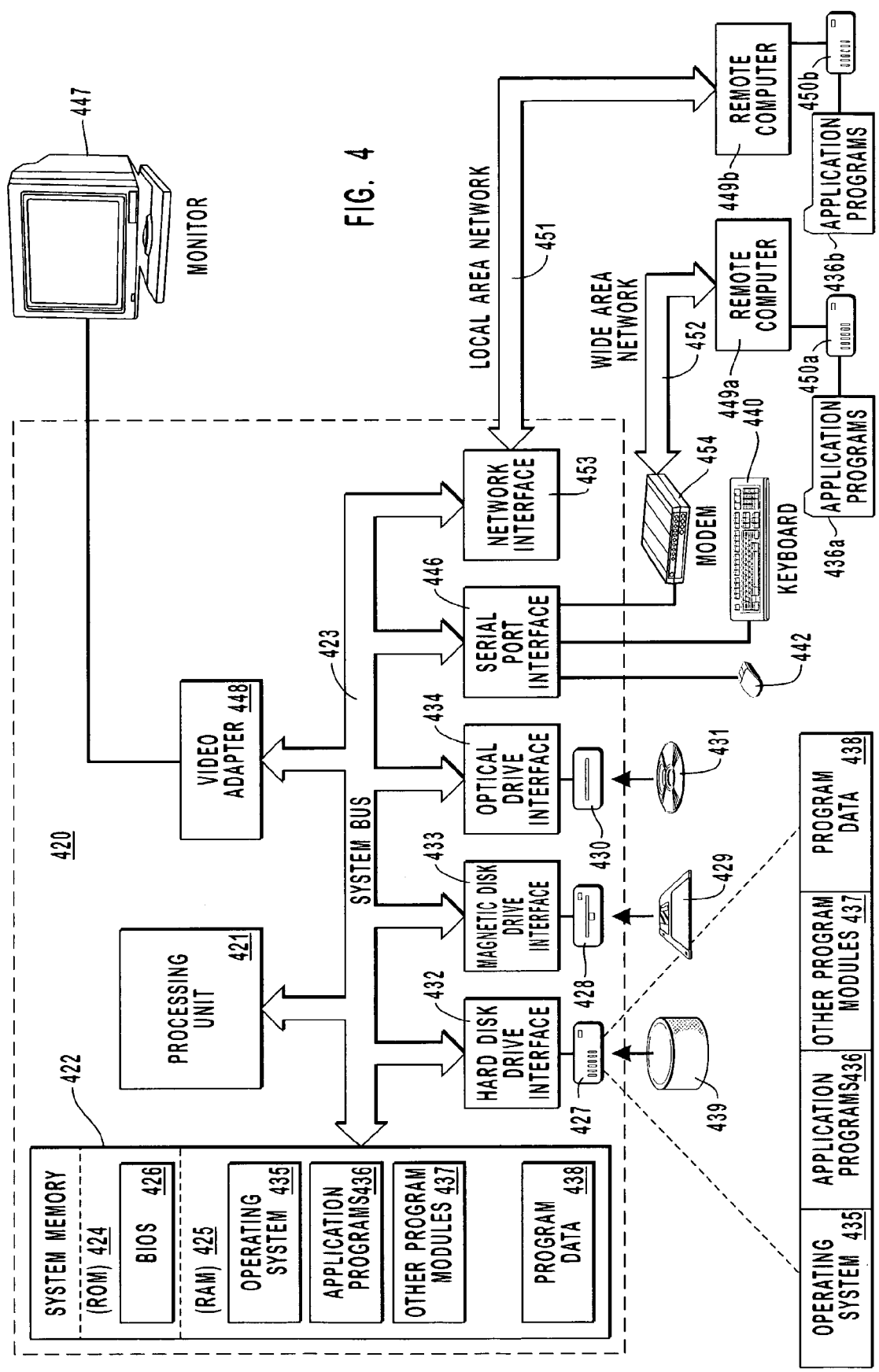

UTILIZING COMMON LAYOUT AND FUNCTIONALITY OF MULTIPLE WEB PAGES

BACKGROUND OF THE INVENTION

1. The Field of the Invention

The present invention generally relates to methods and systems for creating web pages and, more particularly, to methods and systems for creating web pages that share a common layout and/or functionality.

2. Background and Relevant Art

As the use of the Internet continues to grow, so does the need to develop web pages that are capable of providing desired Internet content. It has been realized that the layout and functionality of a web page can be customized to accommodate various needs and preferences. Nevertheless, it is sometimes desirable to create a variety of different web pages that share a common layout, functionality, or content. For example, it may be desirable for a family of web pages that are hosted by a single party to share a common layout so that each of the web pages includes a common menu bar, header, footer, or other content segments.

Providing a common layout and functionality between related web pages can be useful to facilitate navigation through the web pages and to generally provide a common 'look' and 'feel' that a visitor can easily grow accustomed to. Propagating the content and functionality between multiple web pages can also reduce the time and effort that is required to develop related web pages because the developer does not have to entirely 'reinvent the wheel' for each web page that is developed.

Notwithstanding the aforementioned benefits, however, there are certain inefficiencies and consequences that are also associated with sharing a common layout between multiple web pages. In particular, it can require the developer to redundantly program shared content and functionality into each of the web pages that are created. Accordingly, even though the layout and corresponding programming code that are used by the developer do not have to be 'reinvented', they still have to be redundantly copied into each of the corresponding web pages. Additionally, if problems are later discovered in the web pages, it is often necessary for a programmer to individually and redundantly fix the problems that were copied into each of the web pages.

Yet another problem that can be associated with the duplicating of code and content between multiple web pages is that the storage limits of the host system can be filled-up unnecessarily with duplicative content. In other words, a large segment of content or code can undesirably strain the storage capacity of the host when the content segment is redundantly and simultaneously stored for each related web page.

BRIEF SUMMARY OF THE INVENTION

The present invention is directed to systems, methods, and computer program products for creating web pages that share a common layout and/or functionality that overcome some of the aforementioned problems known in the art.

According to one aspect of the invention, a server computing system that is in communication with a client system receives a request from the client system for one or more web pages. The one or more requested web pages have preferably been associated with one or more master pages and one or more content endpoint pages that can be merged to form a resultant page that can be rendered by the client system to satisfy the client system request.

Each master page preferably specifies a common layout and/or functionality that are intended to be shared between multiple web pages that can be requested by the client system. The master pages also include content place holders that identify content segments that are intended to be replaced by content that can be obtained from the one or more corresponding content endpoint pages and that can be used to customize the master page(s) into the web pages requested by the client system.

In one embodiment, when a web page is requested, the server system creates a master page class and an endpoint page class that are merged together into a resulting page that can be transmitted to and rendered by the client system. The step of merging the master page class with an endpoint page class can include various corresponding acts, including, but not limited to, the creation of a master page control tree, the identification of content controls of associated endpoint pages, and the replacement of the content place holders with the content of the content controls.

Once a master page is merged with an endpoint page, the resulting merged page can be transmitted to and rendered by the client system. In some embodiments, the resulting merged page includes content that is derived from multiple nested master pages. In other embodiments, the resulting page includes optional master page content that is provided only in response to certain requirements being satisfied or based upon particular requirements of the client system. In yet other embodiments, the server system determines which of a plurality of master pages to use during creation of the resulting page based upon particular requirements of the client system or as otherwise determined by the server system.

By utilizing the master pages described herein, it is possible to create a standard or common layout that can be shared among a plurality of different web pages, and without having to expend programming resources to duplicate the same shared content during creation of each web page. Master pages also enable web pages to be created automatically, in real-time, transparently to the client system, and without having to redundantly store duplicative content for each of the web pages that share the same layout or functionality.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional, specificity and detail through the use of the accompanying drawings in which:

FIG. 4 illustrates a block diagram of one embodiment of a computing environment in which methods of the invention may be practiced.

DETAILED DESCRIPTION OF THE PREFERRED EMBODIMENTS

Figure 1:
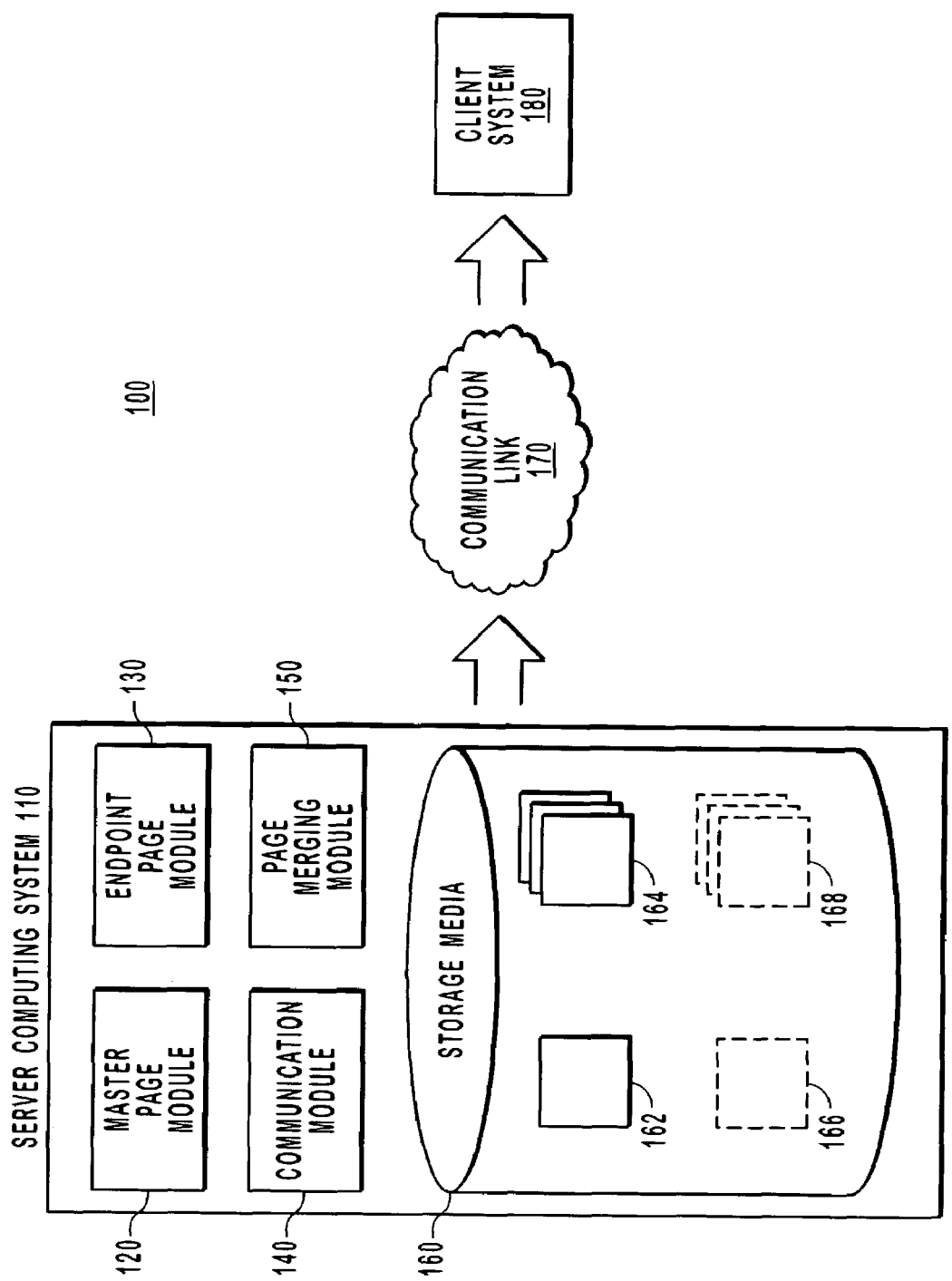
FIG. 1 illustrates a block diagram of one embodiment of a computing environment in which methods of the invention may be practiced.

The present invention extends to both methods and systems for creating web pages that share a common layout and functionality. As described herein, embodiments of the invention include the use of one or more master pages and at least one endpoint page to generate code at a server system that can be provided to a client system for rendering the one or more web pages that share a common layout.

References made herein to a "common layout" shared between web pages should be broadly construed to include any formatting, content, code, controls or other objects that are the same between any two or more web pages.

The term "web page," should also be construed broadly to include any file or document that is obtained by a client system from a server system with the use of a browser or other Internet based tool. Web pages can include text data and/or binary data, such as, for example, graphics, audio, and video data. According to the invention, "web pages" can be programmed with HTML, XML, WML, XSL, Java, or any other languages that are suitable for use with the Internet.

The term "class," is used at times herein in terms of creating master page classes and endpoint page classes. In such instances, the term "class" is generally defined as a temporary file. Although this temporary file can include a C# file, it will be appreciated that the temporary files or classes created in the embodiments of the invention are not limited to any particular programming language or format.

The definitions of any other terms that are used in this application correspond generally with the commonly understood definitions of the terms unless otherwise specified or unless otherwise clarified with the context in which they are used.

As described herein, the embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

FIG. 1 illustrates one embodiment of a computing environment 100 in which methods of the invention may be practiced. The computing environment 100 includes a server computing system 110 that is generally configured to process requests for web pages that are received from one or more client systems in communication with the server computing system 110. The server computing system 110 may comprise, for example, a server, an Internet host, or a computing system that is in communication with an Internet server.

According to one embodiment, the server computing system 110 includes various computer modules that enable the methods of the invention. In the presently illustrated embodiment, the modules provided by the server computing system 110 include a master page module 120, an endpoint page module 130, a communication module 140 and a page merging module 150. It will be appreciated, however, that this specified classification of modules is only provided as a matter of convenience for making reference to certain functionality that is provided by the server computing system 110. Accordingly, the specific module names and classifications should not be used to infer that the modules are necessarily separate or to suggest that their functionality is limited or otherwise restricted by the assigned names of the modules.

According to one embodiment, the server computing system 110 is used to create master pages and endpoint pages that are merged into resulting pages that can be rendered by the client systems as web pages. The client system can request the web pages from the server computing system 110 over any suitable communication link 170, such as, for example, a wireless or a wired network connection.

The client system 180 that requests the web page from the server computing system 110 can include any computing device, such as a personal computer, PDA, mobile computing device, KIOSK, telephone device, and so forth.

When the client system 180 requests a web page from the server computing system 110, the server computing system 110 provides the code and content of the requested web page to the client system, as described herein. It will be appreciated that the server computing system 110 can either host the requested web page (e.g., by storing the code and content of the web page locally) or, alternatively, can obtain the code and content of the requested web page from a remote source.

According to one embodiment, the web page requested by the client system is a web page that shares a common layout, functionality or content with at least one another web page. The code and content of the web page can also be provided by the server computing system 110 to the client system 180, through the methods of the invention, by merging a master page with an endpoint page, each of which can be created by the server computing system 110 or another associated computing system.

The functionality of the server computing system 110 to create the master pages and endpoint pages, as well as the ability to merge the two types of pages into resulting pages of code and content that can be rendered by the client system as web pages, is provided by the modules of the server computing system 110, as mentioned above.

The master page module 120, for example, includes sufficient computer-executable instructions for enabling the creation of a master page that serves as a layout template for a plurality of web pages and that specifies certain content segments to be shared among a plurality of associated web pages. The master page module 120 also enables the creation of content place holders that can be replaced by content segments obtained from customized end point pages, as described below in reference to FIG. 3.

The endpoint page module 130 enables the creation of endpoint pages that reference one or more associated master pages and that include content controls that are associated with the content place holders of the master pages and that include content that is intended to replace the corresponding content place holders of the master pages. In one embodiment, the endpoint page module is also configured to receive and modify endpoint pages that are created by the server system 110 or that are, alternatively, received from another system.

The communication module 140 includes sufficient computer-executable instructions for enabling communication between the various modules and for enabling communication between the server computing system 110 and the client system 180. The communication module 140 also includes sufficient computer-executable instructions for recognizing certain system and display requirements of the client system for identifying which master page will be appropriate for generating the code used by the client system to render a requested web page in a desired and appropriate format, as described below.

The page merging module 150 includes sufficient computer-executable instructions for enabling the parsing of master pages and endpoint pages and the creation of corresponding classes and trees that can be merged together, as described below in reference to FIG. 2. The page merging module 150 also includes sufficient computer-executable instructions for recognizing associations between content controls of the endpoint pages and content place holders of the master pages and for replacing the content place holders with content from corresponding content controls, when appropriate.

According to one embodiment, the storage media 160 of the server computing system 110 is configured to store the master page 162, endpoint pages 164, master page class 166, and endpoint page classes 168 that are utilized by the server computing system 110. It will be appreciated, however, that although the storage media 160 is shown to be physically embodied within the server computing system 110, that the storage media 160 can also be located remotely from server computing system 110. Likewise, even though the storage media 160 is presently shown as a single storage that is capable of independently storing the one or more master page 162, endpoint pages 164, master page class 166, and endpoint page classes 168, it will be appreciated that the storage media 160 may actually include a plurality of disparate storage media.

Creating Web Pages Sharing a Common Layout

Figure 2:
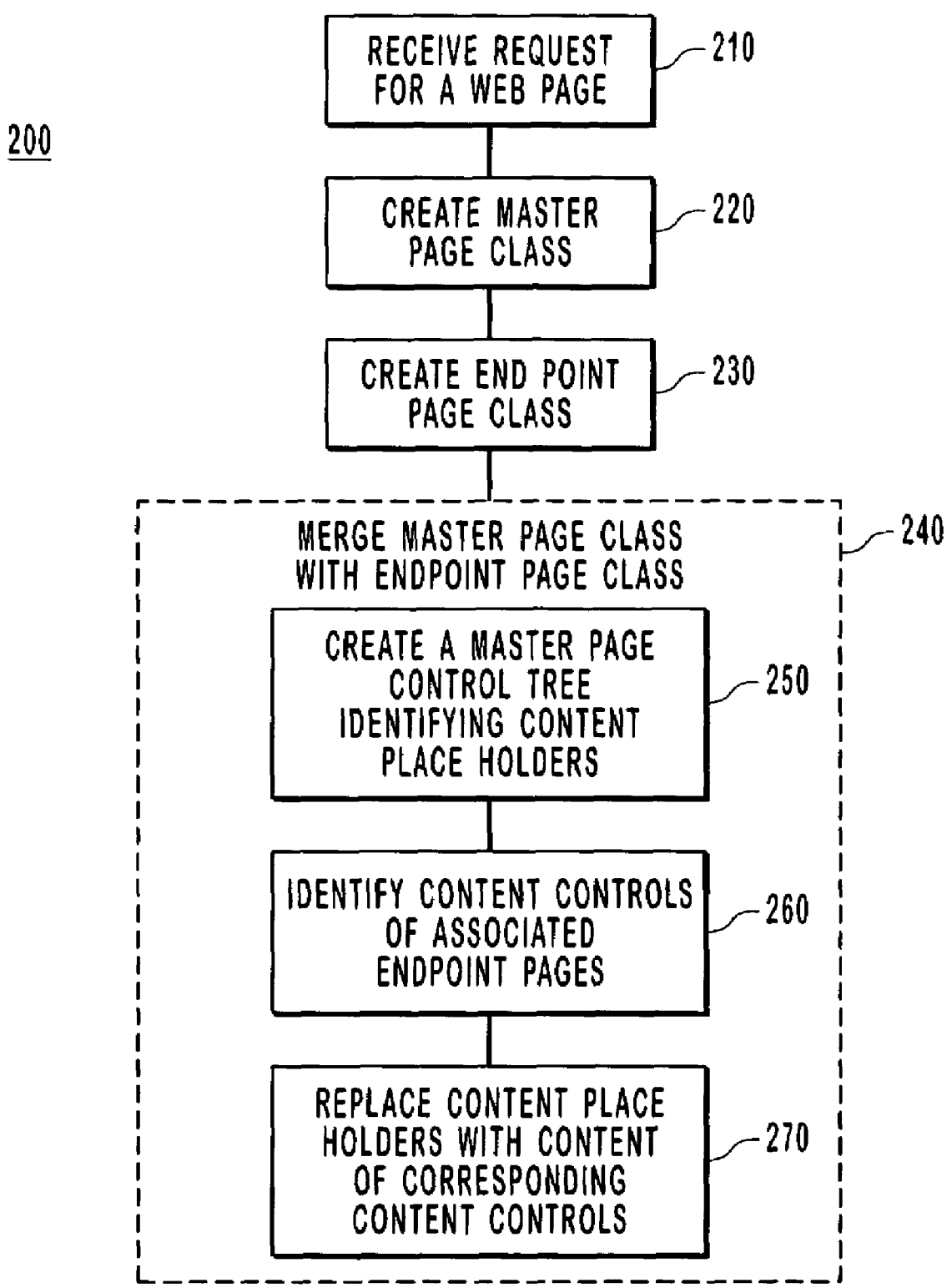
FIG. 2 illustrates a flowchart of one embodiment of a method for generating code at a server system that can be used by a client system to render one or more corresponding web pages having a common layout and functionality.

Attention is now directed to FIG. 2, which illustrates a flowchart 200 of one embodiment of a method of the invention for generating code at a server system and that can be provided to a client system for rendering one or more web pages that share a common layout. As shown, the illustrated method includes an act of receiving a request for a web page (act 210), an act of creating a master page class (act 220), and act of creating an endpoint page class (act 230), a step for merging the master page class with the endpoint page class (step 240), and the corresponding acts of creating a master page control tree (act 250), of identifying content controls (act 260), and of replacing the content place holders with the content of the corresponding content controls (act 270). Each of these acts will now be described in more detail with references being drawn to the embodiments of the master page and endpoint pages shown in FIG. 3.

The first illustrated act (act 210) includes a server system receiving a request for a web page. According to one embodiment, the request for the web page is received from a client system that is in communication with the server system. The requested web page may include a web page that shares a common format with other web pages, as specified by one or more master pages. The requested web page is also associated with at least one endpoint page that has previously been created and that is currently available to the server system.

Master pages and endpoint pages can be created, for example, and associated with addresses, links, handles, or other web page identifiers that can be received and interpreted by the server system. The master pages are programmed with functionality or content that is intended to be shared among multiple web pages. The master page also includes content place holders that can be replaced with the content that is derived from the content controls of endpoint pages that are also associated with the requested web pages.

Figure 3:
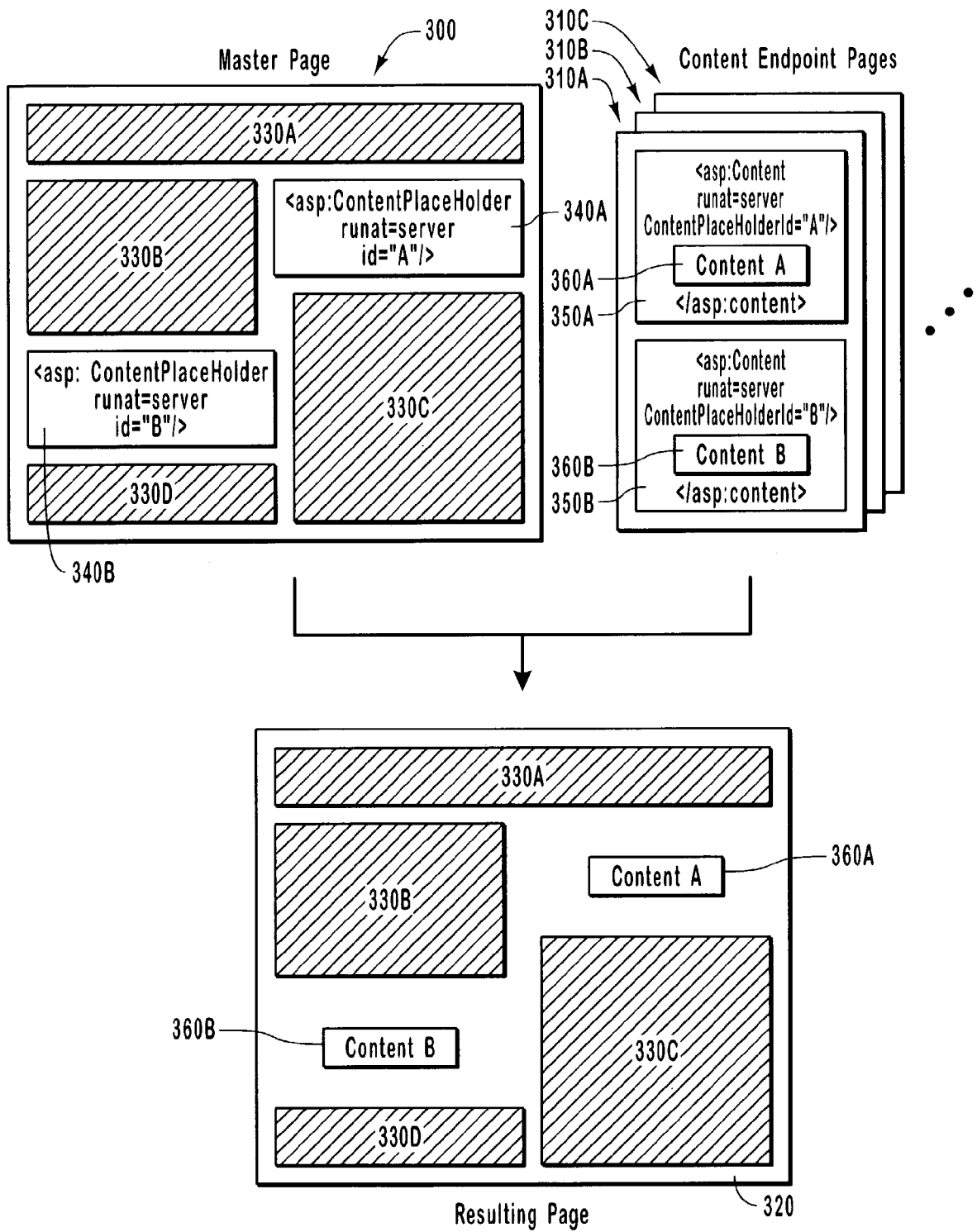
FIG. 3 illustrates one embodiment of a master page, a endpoint page, and a resulting merged page that includes content retrieved from content controls of the endpoint page that replaces the content place holders of the master page.

FIG. 3 conceptually illustrates a master page 300 and endpoint pages 310A, 310B and 310C that can be used to perform the methods of the invention. FIG. 3 also conceptually illustrates how the master page 300 can be merged with a content endpoint page 310A to form a resultant web page 320. As shown, the master page 300 includes several shaded blocks 330A, 330B, 330C and 330D that represent content that is intended to persist in the multiple web pages sharing the common layout specified by the master page 300. Accordingly, the web pages that are rendered from the methods of the invention, and that utilize the common layout provided by the master page 300, will each include the content represented by the shaded blocks 330A, 330B, 330C and 330D. For example, the resulting page 320 is shown to include the same shaded content blocks 330A, 330B, 330C and 330D that are present in the master page 300. Although the content that is shared from the master page 300 is illustrated conceptually as shaded blocks, it will be appreciated that the actual content corresponding to the shaded blocks 330A, 330B, 330C and 330D can include other objects, such as text, images, audio, controls and so forth.

Once the server system receives the request for the web page (act 210), then the server system creates a master page class (act 220) and an endpoint page class (act (230) that can be merged together. According to one embodiment, the master page class and end point page class each comprise temporary files, such as, but not limited to C# files that can be stored by the server computing system. The page classes preferably represent or otherwise describe the master page and the endpoint pages to which they correspond. Once these page classes are created, they can be merged together as recited in step 240.

It will be appreciated that the endpoint page that is used to create the endpoint page class corresponds specifically to the one or more endpoint pages that are requested by the client system or that otherwise corresponds to the web page requested by the client system. For example, if the web page requested by the client system corresponds to a particular content endpoint page, then that specific content endpoint page is used as the basis for the creation of the endpoint page class that will be merged with the master page class to form the resulting page or merged file that can be transmitted to and rendered by the client system.

It will also be appreciated that the step for merging (step 240) can be performed with any corresponding acts that are suitable for combining the master page class and the endpoint page class together into a final merged document or file that can be used by the client system to render the desired web page. In one embodiment, merging the master page and endpoint page classes together (step 240) includes the corresponding acts of creating a master page control tree that identifies master page content place holders (act 250), identifying content controls of endpoint pages that are associated with the content place holders (act 260), and replacing the content place holders with the content of the corresponding content controls (act 270).

According to one embodiment, the recited act of creating a control tree may comprise the creation of indices, tables or other reference objects that are capable of identifying the various content segments of the master page 300 and their relative placements in the master page. For example, the control tree, which is not shown, may identify the content segments of the master page 300 that are to be shared between multiple web pages (e.g., shaded blocks 330A, 330B, 330C and 330D) and the content place holders of the master page 300 that are intended to be replaced within the various web pages (e.g., content 360A, 360B) in a simple table or tree structure. This can be accomplished, for example, during a parsing operation or scanning operation of the master page.

It will be noted that the content place holders 340A and 340B are associated with a name or other identifier that can be referred to by the content endpoint pages. In the present embodiment, the content place holders 340A and 340B have been named "A" and "B", respectively. However, that the actual names of the content place holders are not important and should not, therefore, be construed as restricting the scope of the invention. Rather, the names "A" and "B", which have been assigned to the content place holders 340A and 340B, have been assigned merely as a matter of convenience for describing certain embodiments of the invention.

It will be appreciated that one benefit of naming the content place holders 340A and 340B is that the content endpoint pages can specifically reference the content place holders by name and can thereby associate specific content controls with corresponding content place holders 340A and 340B. For example, in the present embodiment, the content control 350A has been associated with the content place holder 340A by name ("A"). Likewise, the content control 350B has been associated with the content place holder 340B by name ("B").

According to the present embodiment, each content control 350A and 350B is associated with content 360A and 360B that is intended to replace the content place holders of the master page 300 when appropriate. The content of the content controls can include text, objects, images, audio or any other elements that can be replace the content place holders during merging of the appropriate end point page and master page. For example, the content 360A, which is identified as "content A", has been designated as a suitable replacement for the content place holder 340A of the master page 300.

In one embodiment of the invention, each of the content controls can also specify conditions under which their content is to replace the content place holders, such that replacement of the content place holders with the content of the content controls is conditional upon the occurrence one or more events or circumstances. This can be useful, as mentioned below, to accommodate various requirements of different client systems.

The act of identifying the content controls can be performed during parsing of the content endpoint pages or during any other suitable operation. For example, when a client system requests a particular web page that is associated with a content endpoint page, the server system can obtain and parse that content endpoint page to identify the content controls that are present within the content endpoint page. Thereafter, the content of the identified content controls can be used to replace the corresponding content place holders that they are associated with to form a resulting page or merged file that can be transmitted to the client system.

For example, the resulting page 320 comprises the common layout specified by the master page and includes the content 360A and 360B of the content controls 350A and 350B that have been associated with the replaced content place holders 340A and 340B of the master page 300. Accordingly, in this manner, the resulting page 320 comprises a merged document or file that includes the common layout and functionality specified by the master page 300, while at the same time including the customizable content that is specified by the particular content endpoint page that corresponds to the requested web page. The resulting page 320 can then be sent to the client system and rendered in satisfaction of the request for a desired web page.

Although a specific example has just been provided, it will be appreciated that the scope of the present invention extends to various other embodiments as well. For example, in one alternative embodiment, master pages also can be nested within each other, such that the common layout or functionality provided by a master page includes the combined layout and functionality of multiple master pages. In particular, a master page can refer to other master pages and incorporate them into any resulting page that is formed. In such embodiments, the methods of the invention may include the parsing of multiple master pages and the building of multiple master page classes or a single consolidated and merged master page class.

In another embodiment, the content endpoint pages can each be associated with various different master pages that are intended for different purposes. For example, multiple different master pages can be created to accommodate different types of operating systems, browsers, and display device capabilities that are provided by different computing devices, such as telephone devices, PDA's, desktop devices, web-TV devices, and so forth. Accordingly, the scope of the invention extends to embodiments in which the server system can accommodate the specific requirements (e.g., display formats, OS processing requirements) of the client system for rendering or processing a requested web page. To accommodate these specific requirements, the server system can utilize the appropriate master page that can satisfy those requirements. It will be appreciated that the server system can be configured to automatically recognize the client system requirements or to be notified of client system requirements by the client system or some intermediary device.

In another embodiment, the server system can be configured to control which of multiple master pages are utilized to form a resulting page based upon predetermined criteria that are satisfied by the occurrence of one or more events or circumstances. This embodiment can be useful, for example, to enable a server system to provide different content/ services to different users based upon different subscriptions, privileges, authorization levels, and client system requirements, while at the same time enabling multiple web pages to share a common layout specified by the one or more master pages.

According to yet another embodiment, a single master page may be created with content place holders that are only optionally replaced when one or more of the predetermined criteria are satisfied. This can be particularly useful for reducing storage requirements, while at the same time still enabling the creation of multiple different common layouts and functionality that can be extended to related web pages. For example, a single master page may include content place holders that will be replaced with content from endpoint pages under one set of circumstances, but not under another. Accordingly, the single master page can effectively operate as two or more separate master pages that each provide a common layout and functionality for a plurality of related web pages. In this embodiment, a master page can include default content that is only replaced or overridden when the predetermined criteria are satisfied.

To enable these alternative embodiments, the modules of the server system can be configured with appropriate computer-executable instructions to recognize predetermined criteria that are imposed by a master page, client system, or server system and to recognize when these predetermined criteria have been satisfied.

In summary, the present invention generally enables a plurality of web pages that share a common layout and functionality to be created and rendered with the use of master pages and content endpoint pages. One benefit of the present invention is that by utilizing master pages, it is possible to create a standard or common layout that can be shared among a plurality of different web pages, and without having to expend programming resources to duplicate the same shared content during creation of each web page.

Another benefit of the invention is that the merging of a master page and an endpoint page, which occurs at the server system, is performed automatically, in real-time, and is therefore unnoticeable to the client system. This can beneficially eliminate requirements for the client system to perform special processing to obtain the desired web page. This can also eliminate the requirement for the server system to redundantly store duplicative content for each of the plurality of web pages that share the same layout and or functionality that is specified by the master pages.

It will be appreciated that although certain embodiments of the invention described above refer to a particular flow chart 200 shown in FIG. 2, that the scope of the invention extends beyond the specific method illustrated in FIG. 2. Accordingly, the illustrated acts 210, 220, 230, 250, 260 and 270 do not necessarily have to be performed sequentially in the order shown. Likewise, the illustrated method can also include other acts that are not illustrated, such as creating a master page and/or an endpoint page, recognizing special client system requirements, selecting a master page that corresponds to the special client system requirements, transmitting the resulting page and or code to the client system for rendering, and so forth.

Exemplary Computing Environment

Those skilled in the art will also appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing methods of the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449*a* and 449*b*. Remote computers 449*a* and 449*b* may each be another personal computer, a server, a router, a network PC, a peer device or other common network node, and typically include many or all of the elements described above relative to the computer 420, although only memory storage devices 450*a* and 450*b* and their associated application programs 436*a* and 436*b* have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a server system comprising a master page module, an end point module and a communication module, the server system being connected with a client system and that is capable of accessing a plurality of master pages that define common layouts and functionality for a plurality of associated web pages that can be rendered at client systems, each master page containing content place holders which are to be replaced by content determined on a client-specific basis, a method for using the master page and content controls to generate code that can be used to render a web page, the method comprising:

the server system receiving a request from a client system for a web page, the web page sharing a common format with another web page, and the web page associated with at least one endpoint page that has previously been created and is currently available to the server system;

the server system determining one or more client-specific requirements for rendering web pages at the client system;

the master page module identifying an appropriate master page from a plurality of distinct master pages;

the master page module creating content place holders for the appropriate master page, wherein the content place holders of the appropriate master page are to be replaced by content segments obtained from customized end point pages;

the endpoint module identifying one or more endpoint pages, the identified endpoint pages corresponding to the content segments that are to replace the content place holders of the appropriate master page, and the identified endpoint pages being selected based at least in part on the client-specific requirements;

the server system creating a master page class and an endpoint page class that can be merged together, the master page class and the endpoint page class representing the appropriate master page and the one or more identified endpoint pages to which they correspond identifying, from the one or more end point pages, one or more content controls that correspond to each of the one or more content place holders, the identified content controls enabled to generate content based at least in part upon the one or more client specific requirements, and wherein content of the content controls is conditional upon the occurrence one or more events and circumstances; and placing the content obtained from the identified content controls into the one or more content place holders of the appropriate master page within a web page that accommodates the one or more client-specific requirements.

2. A method as recited in 1, wherein the additional content obtained from the one or more associated content controls overrides default content that is provided with the at least one content place holder and that is configured to be rendered when the additional content is not received.

3. A method as recited in claim 1, further including an act of the client system accessing the merged file and rendering the requested web page with the merged file.

4. A method as recited in claim 1, wherein the appropriate master page comprises one of a plurality of different specialized master pages that can each be used to generate code for rendering the requested web page.

5. A method as recited in claim 1, wherein the requested web page includes at least one of HTML, XML, WML and XSL content.

6. A method as recited in claim 1, wherein the appropriate master page is nested within another master page.

7. A system comprising one or more computer processors and one or more computer readable storage media and upon which executes the method of claim 1.

8. The system of claim 7 wherein the method further comprises obtaining the code and content of the requested web page from a remote source.

9. A system as recited in claim 7, wherein the additional content obtained from the one or more associated content controls overrides default content that is provided with the at least one content place holder and that is configured to be rendered when the additional content is not received.

10. A system as recited in claim 7, the method further including an act of the client system accessing the merged file and rendering the requested web page with the merged file.

11. A system as recited in claim 10, wherein the system transmits the merged file to the client system.

12. A system as recited in claim 7, wherein the requested web page includes at least one of HTML, XML, WML and XSL content.

13. A system as recited in claim 7, wherein the appropriate master page is nested within another master page.

14. A system as recited in claim 7, wherein the client system is unaware of the merging of the master page class and the endpoint page class.

15. A method as recited in claim 1, wherein the appropriate master page is specifically requested by the client system based upon one or more client specific requirements.

16. A method as recited in claim 1, wherein the appropriate master page is specifically requested by the client system based upon a desired display format of the requested web page.

17. A method as recited in claim 1, wherein the appropriate master page that is utilized by the server system is selected by the server system based upon one or more predetermined criteria.

18. A method as recited in claim 17, wherein the predetermined criteria include at least one of a subscription, privilege, authorization level, and client system requirements.

19. A computer program product for use in a server system that is connected with a client system and that is capable of accessing a plurality of master pages that define common layouts and functionality for a plurality of associated web pages that can be rendered at client systems, each master page containing content place holders which are to be replaced by content determined on a client-specific basis, a method for using the master page and content controls to generate code that can be used to render a web page, the computer program product comprising one or more computer-readable media having stored thereon computer executable instructions that, when executed by a processor, cause the server system to perform the method recited in claim 1.

20. A computer program product as recited in 19, wherein the additional content obtained from the one or more associated content controls overrides default content that is provided with the at least one content place holder and that is configured to be rendered when the additional content is not received.

21. A computer program product as recited in claim 19, further including computer-executable instructions that, when executed, cause the server system to access the merged file and rendering the requested web page with the merged file.

22. A computer program product as recited in claim 19, wherein the requested web page includes at least one of HTML, XML, WML and XSL content.

23. A computer program product as recited in claim 19, wherein the appropriate master page is nested within another master page.

* * * * *